United States Patent
Xu et al.

(10) Patent No.: US 10,563,848 B2
(45) Date of Patent: Feb. 18, 2020

(54) BACKLIGHT MODULE AND DISPLAY APPARATUS

(71) Applicant: BOE TECHNOLOGY GROUP CO., LTD., Beijing (CN)

(72) Inventors: Jian Xu, Beijing (CN); Yongda Ma, Beijing (CN); Yongchun Lu, Beijing (CN); Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 125 days.

(21) Appl. No.: 15/553,493

(22) PCT Filed: Apr. 7, 2017

(86) PCT No.: PCT/CN2017/079721
§ 371 (c)(1),
(2) Date: Aug. 24, 2017

(87) PCT Pub. No.: WO2017/219731
PCT Pub. Date: Dec. 28, 2017

(65) Prior Publication Data
US 2018/0245779 A1      Aug. 30, 2018

(30) Foreign Application Priority Data

Jun. 22, 2016      (CN) ..................... 2016 2 0626045 U

(51) Int. Cl.
*F21V 17/16*      (2006.01)
*F21V 23/06*      (2006.01)
(Continued)

(52) U.S. Cl.
CPC ............ *F21V 17/164* (2013.01); *F21V 17/06* (2013.01); *F21V 23/06* (2013.01); *G02F 1/1336* (2013.01);
(Continued)

(58) Field of Classification Search
CPC ........ F21V 17/164; F21V 17/06; F21V 23/06; F21V 29/70; G02F 1/1336; G02F 2201/465; G02F 2201/46; G02F 1/133608
See application file for complete search history.

(56) References Cited

U.S. PATENT DOCUMENTS 9,194,996 B2 *  11/2015  Yu ....................... G02B 6/0073
2009/0128732 A1   5/2009  Hamada
(Continued)

FOREIGN PATENT DOCUMENTS

CN      102155718 A       8/2011
CN      202024202 U      11/2011
(Continued)

OTHER PUBLICATIONS

Machine English Translation of CN204554543U Zuo (Year: 2015).*
(Continued)

*Primary Examiner* — Bao Q Truong
*Assistant Examiner* — Glenn D Zimmerman
(74) *Attorney, Agent, or Firm* — Nath, Goldberg & Meyer; Joshua B. Goldberg; Daniel J. Bissing

(57) ABSTRACT

The backlight module provided in the present disclosure comprises a backplate and a light-emitting device, and the backplate has a mounting surface. The light-emitting device comprises a mounting member and a light source disposed on the mounting member. Moreover, the backplate comprises a concave portion and/or a convex portion, and the concave portion and/or the convex portion fixes the mounting member onto the mounting surface. The backlight module provided in the present disclosure can simplify steps of assembling or disassembling the light-emitting device, thus production efficiency can be improved and high integration manufacturing of backlight modules can be facilitated.

14 Claims, 3 Drawing Sheets

(51) Int. Cl.
  *F21V 17/06* (2006.01)
  *G02F 1/13357* (2006.01)
  *F21V 29/70* (2015.01)
  *G02F 1/1335* (2006.01)

(52) U.S. Cl.
  CPC ........ *F21V 29/70* (2015.01); *G02F 1/133608* (2013.01); *G02F 2201/46* (2013.01); *G02F 2201/465* (2013.01)

(56) References Cited

U.S. PATENT DOCUMENTS

| | | | | |
|---|---|---|---|---|
| 2011/0273895 | A1* | 11/2011 | Uemoto | F21V 23/009 362/430 |
| 2012/0307175 | A1* | 12/2012 | Zhou | G02B 6/009 349/61 |
| 2012/0314431 | A1 | 12/2012 | Lin et al. | |
| 2013/0279147 | A1* | 10/2013 | De Wind | B60R 1/12 362/23.03 |

FOREIGN PATENT DOCUMENTS

| | | |
|---|---|---|
| CN | 202349791 U | 7/2012 |
| CN | 102759040 A | 10/2012 |
| CN | 204554543 U | 8/2015 |
| CN | 205691914 U | 11/2016 |
| JP | 2009-283261 A | 12/2009 |

OTHER PUBLICATIONS

Machine English Translation of CN202349791U Deng et al; (Year: 2012).*
International Search Report dated Jun. 2, 2017 issued in corresponding International Application No. PCT/CN2017/079721.

* cited by examiner

BACKLIGHT MODULE AND DISPLAY APPARATUS

This is a National Phase Application filed under 35 U.S.C. 371 as a national stage of PCT/CN2017/079721, filed Apr. 7, 2017, an application claiming the benefit of Chinese Application No. 201620626045.4, filed Jun. 22, 2016, the content of each of which is hereby incorporated by reference in its entirety.

TECHNICAL FIELD

The present invention relates to the manufacturing and assembling field of display apparatuses, and particularly relates to a backlight module and a display apparatus including the backlight module.

BACKGROUND

Backlight sources in existing backlight modules mainly include edge type backlight sources and direct type backlight sources. For an edge type backlight source, the light source is mounted on a side plate of a backplate, and light emitted from the light source propagates towards a light-exiting surface after entering an optical film. For a direct type backlight source, the light source is mounted on a bottom plate of a backplate, and light emitted from the light source propagates towards a light-exiting surface after transmitting through an optical film.

In an existing backlight module, a light source is generally mounted on a circuit board mounted on a backplate. The circuit board is generally mounted on the backplate in one of the following manners:

mounting the circuit board on the backplate through screws;

bonding the circuit board onto the backplate through an adhesive strip; and fastening the circuit board onto the backplate using a fastener.

However, use of the above three manners may make steps of assembling or disassembling the light source cumbersome, and thus reduce production efficiency, which is not conducive to high integration manufacturing of backlight sources.

SUMMARY

The present disclosure is intended to alleviate or avoid at least one of the technical problems existing in the prior art, and provides a backlight module and a display apparatus comprising the backlight module, which can simplify the steps of assembling or disassembling a light-emitting device (light source), thus can improve the production efficiency, and is conducive to high integration manufacturing of backlight modules.

To achieve the above object, in one aspect, the present disclosure provides a backlight module, comprising a backplate and a light-emitting device, the backplate having a mounting surface, the light-emitting device comprising a mounting member and a light source disposed on the mounting member, wherein the backplate comprises a concave portion and/or a convex portion, the concave portion and the convex portion are able to fix the mounting member onto the mounting surface.

Optionally, the backplate comprises the concave portion and the convex portion, wherein the concave portion is a first groove formed by a first protrusion protruding in a direction perpendicular to the mounting surface; the convex portion comprises a second protrusion protruding in the direction perpendicular to the mounting surface and at least one extension portion provided at a side of the second protrusion, the extension portion is parallel to the mounting surface and spaced apart from the mounting surface by a certain distance such that part of the mounting member is held between the extension portion and the mounting surface.

Optionally, the concave portion is snapped to one edge of the mounting member, and the convex portion is snapped to another edge of the mounting member; the first protrusion includes two parts spaced apart from each other and a space between the two parts forms the first groove.

Optionally, the concave portion is snapped to one edge of the mounting member, and the convex portion is snapped to another edge of the mounting member; the first protrusion is a concave piece, and a space between the concave piece and the mounting surface forms the first groove.

Optionally, one edge of the mounting member is provided with a first convex piece, the first convex piece and the concave portion are snapped with each other, and another edge of the mounting member and the second protrusion are snapped with each other.

Optionally, said another edge of the mounting member is provided with a first concave piece, the first concave piece and the second protrusion are snapped with each other.

Optionally, the concave portion and the convex portion are snapped to two opposite edges of the mounting member, respectively, the backplate includes a plurality of the concave portions and a plurality of the convex portions, and the concave portions and the convex portions are staggered with respect to each other.

Optionally, the extension portion protrudes outwards from the second protrusion in a direction parallel to an edge of the mounting member.

Optionally, the extension portion protrudes outwards from the second protrusion in a direction perpendicular to an edge of the mounting member.

Optionally, the backplate includes concave portions including a first concave portion and a second concave portion, the first concave portion and the second concave portion are snapped to two edges of the mounting member, respectively; the first concave portion is a first groove formed between a first concave piece provided on the mounting surface and the mounting surface; and the second concave portion is a second groove formed between a second concave piece provided on the mounting surface and the mounting surface.

Optionally, the backplate includes concave portions including a first concave portion and a second concave portion, the first concave portion and the second concave portion are snapped to two edges of the mounting member, respectively; the first concave portion is a first groove formed by a first protrusion protruding in a direction perpendicular to the mounting surface, the first protrusion includes two parts spaced apart from each other and a space between the two parts forms the first groove; and the second concave portion is a second groove formed by a second protrusion protruding in the direction perpendicular to the mounting surface, the second protrusion includes two parts spaced apart from each other and a space between the two parts forms the second groove.

Optionally, the backplate includes concave portions including a first concave portion and a second concave portion, the first concave portion and the second concave portion are snapped to two edges of the mounting member, respectively; the first concave portion is a first groove formed between a concave piece provided on the mounting surface and the mounting surface; and the second concave portion is a second groove formed by a second protrusion protruding in the direction perpendicular to the mounting surface, the second protrusion includes two parts spaced apart from each other and a space between the two parts forms the second groove.

Optionally, a third protrusion and a fourth protrusion are provided on two edges of the mounting member, respectively, wherein the third protrusion and the first groove are snapped with each other, and the fourth protrusion and the second groove are snapped with each other.

Optionally, the first concave portion and the second concave portion are snapped to two opposite edges of the mounting member, respectively, the backplate includes a plurality of the first concave portions and a plurality of the second concave portions, and the first concave portions and the second concave portions are staggered with respect to each other.

Optionally, the backplate includes convex portions including a first convex portion and a second convex portion, the first convex portion and the second convex portion are provided on the mounting surface and snapped to two edges of the mounting member, respectively; at least one of the first convex portion and the second convex portion is provided with an extension portion to hold a part of the mounting member between the extension portion and the mounting surface.

Optionally, the first convex portion and the second convex portion are snapped to two opposite edges of the mounting member, respectively, the backplate includes a plurality of the first convex portions and a plurality of the second convex portions, and the first convex portions and the second convex portions are staggered with respect to each other.

Optionally, the backplate includes a bottom plate and a side plate surrounding the bottom plate, and an inner surface of the side plate serves as the mounting surface.

Optionally, the light-emitting device further includes a connector, an opening is provided on the side plate, and the connector is provided in the opening to electrically connect the light source to an external power supply.

Optionally, the backplate includes a bottom plate and a side plate surrounding the bottom plate, and an inner surface of the bottom plate serves as the mounting surface.

In another aspect, there is provided a display apparatus including a backlight module, which is any one of the above backlight modules provided by the present disclosure.

The present disclosure has the beneficial effects as follows.

The backlight modules provided by the present disclosure fix, by means of the concave portion and/or the convex portion, the mounting member of the light-emitting device onto the mounting surface of the backplate, the assembly and fixing of the light-emitting device can be realized without an additional fixing piece, so that steps of assembling or disassembling the light-emitting device can be simplified, which, in turn, can improve production efficiency and be conducive to high integration manufacturing of backlight modules.

The display apparatus provided by the present disclosure adopts the above backlight module provided by the present disclosure, therefore, steps of assembling or disassembling the light-emitting device can be simplified, and thus production efficiency can be improved, and high integration manufacturing of backlight modules is facilitated.

DETAILED DESCRIPTION OF THE EMBODIMENTS

To enable those skilled in the art to better understand technical solutions of the present disclosure, a backlight module and a display apparatus comprising the backlight module provided in the present disclosure will be described in detail below in conjunction with the accompanying drawings.

A backlight module provided by the present disclosure includes a backplate and a light-emitting device, and the light-emitting device is mounted on a surface (thereinafter referred to as mounting surface) of the backplate. The backplate may include a bottom plate and a side plate, and the side plate may surround the bottom plate. In an edge type backlight module, an inner surface of the side plate may serve as the mounting surface, and the light-emitting device may be mounted on the inner surface of the side plate. In a direct type backlight module, an inner surface of the bottom plate may serve as the mounting surface, and the light-emitting device may be mounted on the inner surface of the bottom plate. The light-emitting device may include a mounting member and a light source disposed on the mounting member, and the mounting member may be a circuit board, or may also include a heat-dissipating plate for the circuit board or the light source.

A concave portion and/or a convex portion are/is provided on the mounting surface of the backplate (i.e., the inner surface of the side plate or bottom plate of the backplate) to fix the light-emitting device onto the mounting surface. In this way, assembly and fixing of the light-emitting device can be achieved without additional fixing piece, so that steps of assembling and disassembling the light-emitting device can be simplified, which, in turn, can improve production efficiency and be conducive to high integration manufacturing of backlight modules.

Specific implementations of the concave portion and/or convex portion will be described in detail below by taking a case where the inner surface of the side plate serves as the mounting surface as an example.

Figure 1:
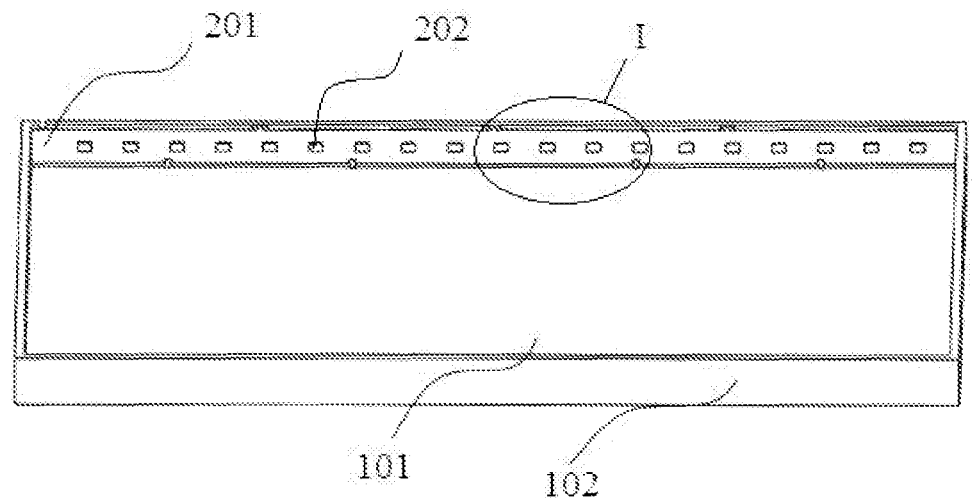
FIG. 1 is a structural diagram of a backlight module provided by an embodiment of the present disclosure.
Figure 2:
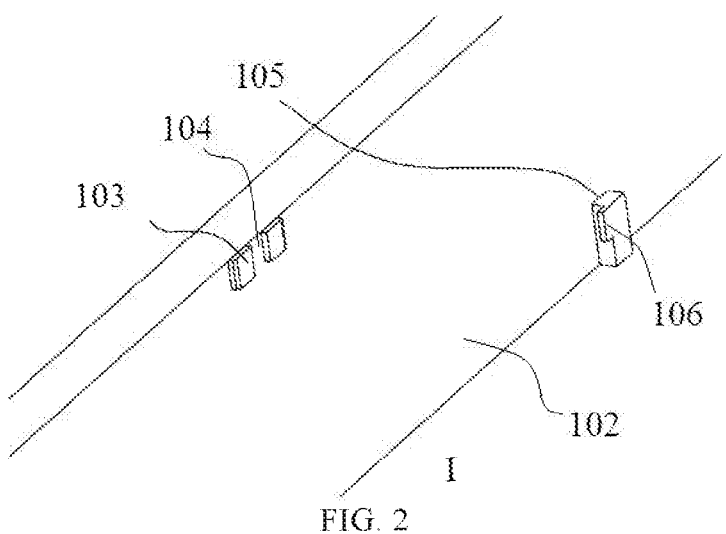
FIG. 2 is an enlarged view of a backplate in area I in FIG. 1.
Figure 3:
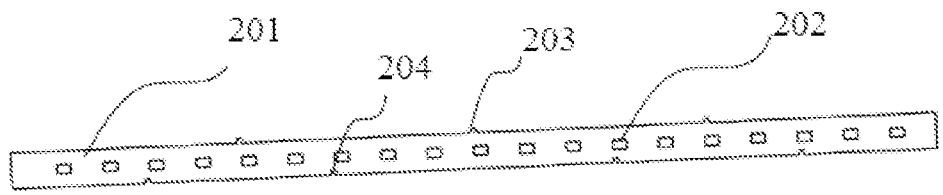
FIG. 3 is a structural diagram of a light-emitting device in FIG. 1.

FIG. 1 is a structural diagram of a backlight module provided by an embodiment of the present disclosure, FIG. 2 is an enlarged view of a backplate in area I in FIG. 1, and FIG. 3 is a structural diagram of a light-emitting device in FIG. 1. As shown in FIGS. 1 to 3, the backplate includes a bottom plate 101 and a side plate 102 surrounding the bottom plate 101, and the inner surface of the side plate 102 at one side thereof serves as the mounting surface, and is provided with a concave portion and a convex portion. In some embodiments, as shown in FIG. 2, the concave portion may be a first groove 104 formed by a first protrusion 103 protruding in a direction perpendicular to the inner surface (mounting surface) of the side plate 102. Specifically, the first protrusion 103 includes two parts spaced apart from each other and the space between the two parts forms the first groove 104. The convex portion may include a second protrusion 105 protruding in the direction perpendicular to the inner surface of the side plate 102, and at least one extension portion 106 provided at a side of the second protrusion 105. The extension portion 106 extends outwards from the second protrusion 105, and is parallel to the inner surface of the side plate 102 with a certain gap therebetween. It could be understood that the gap between the extension portion 106 and the inner surface of the side plate 102 has a length equal to or slightly larger than a thickness of the light-emitting device such that a part of the light-emitting device may be inserted into the gap between the extension portion 106 and the inner surface of the side plate 102. An extending direction of the extension portion 106 from the second protrusion 105 may be parallel to an upper edge or lower edge of the side plate 102, as shown in FIG. 2. Needless to say, the extending direction of extension portion 106 from the second protrusion 105 may not be parallel to the upper edge or lower edge of the side plate 102, for example, the extending direction may be perpendicular to the upper edge or lower edge of the side plate 102, as long as a part of the light-emitting device can be inserted into the gap between the extension portion 106 and the inner surface of the side plate 102. The first protrusion 103 and the second protrusion 105 may be integrally formed with the side plate 102 of the backplate, for example, the first and second protrusions and the side plate 102 of the backplate are formed simultaneously by stamping.

As shown in FIG. 3, the light-emitting device includes a mounting member 201 and a plurality of light sources 202 disposed on the mounting member 201, the concave portion is snapped to one edge of the mounting member 201, and the convex portion is snapped to another edge of the mounting member 201 opposite to the one edge. Specifically, a first convex piece 203 and a first concave piece 204 are provided on upper and lower edges of the mounting member 201, respectively, as shown in FIG. 3. In this case, the mounting member 201 is attached to the inner surface of the side plate 102 such that the first convex piece 203 is inserted into the first groove 104, and the second protrusion 105 is inserted into the first concave piece 204, and thus the mounting member 201 and the side plate 102 are snap-connected. In addition, since a part of the mounting member 201 is inserted into the gap between the extension portion 106 and the inner surface of the side plate 102, the mounting member 201 can be held between the extension portion 106 and the inner surface of the side plate 102 to keep the mounting member 201 in place. The first convex piece 203 and the first concave piece 204 may be integrally formed with the mounting member 201. Needless to say, in practical applications, either the first convex piece 203 or the first concave piece 204 is provided, as long as the mounting member 201 and the side plate 102 can be snap-connected.

Figure 4A:
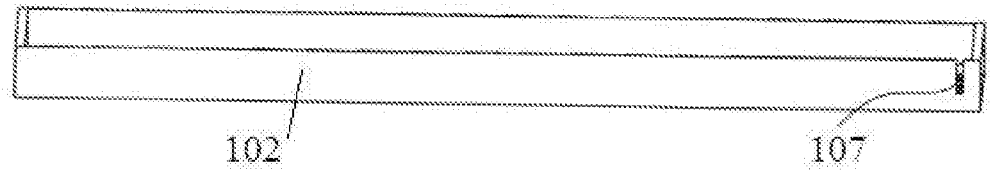
FIG. 4A is a side view of a backplate used in an embodiment of the present disclosure.
Figure 4B:
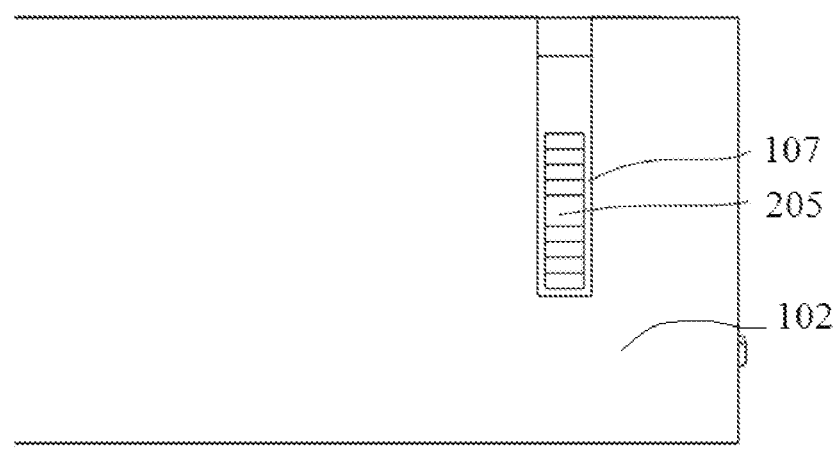
FIG. 4B is a partially enlarged view of a backplate used in an embodiment of the present disclosure.

FIG. 4A is a side view of a backplate used in an embodiment of the present disclosure, and FIG. 4B is a partially enlarged view of a backplate used in an embodiment of the present disclosure. As shown in FIGS. 4A and 4B, the light-emitting device may further include a connector 205. In this case, an opening 107 is provided on the side plate 102, and the connector 205 is provided in the opening 107 to electrically connect the light sources 202 to an external power supply.

In an embodiment of the present invention, there may be a plurality of concave portions (e.g., the first grooves 104) and a plurality of convex portions (e.g., the second protrusions 105), wherein the plurality of concave portions are arranged at an interval along one edge (e.g., upper edge) of the side plate 102, and the plurality of convex portions are arranged at an interval along another edge (e.g., lower edge) of the side plate 102, so as to increase snap-on points. Moreover, when the concave portions and the convex portions are arranged at opposite edges (e.g., upper edge and lower edge) of the side plate, respectively, the plurality of concave portions and the plurality of convex portions are arranged to be staggered with respect to each other, so as to avoid a case where the mounting member 201 and the side plate 102 are partially separated. In addition, the number and positions of the first convex pieces 203 of the mounting member 201 should be respectively in one-to-one correspondence with the number and positions of the first grooves 104, and the number and positions of the first concave pieces 204 of the mounting member 201 should be respectively in one-to-one correspondence with the number and positions of the second protrusions 105.

It should be noted that, in the present embodiment, the extension portion 106 protrudes outwards from the second protrusion 105 in a direction parallel to the upper edge of the side plate 102, but the present disclosure is not limited thereto. For example, the extension portion 106 may protrude outwards (upwards) from the second protrusion 105 in a direction perpendicular to the lower edge of the side plate 102, and in this way, a part of the mounting member 201 can also be inserted into the gap between the extension portion 106 and the inner surface of the side plate 102. In this case, the mounting member 201 may be provided with the first concave pieces 204 to be engaged with the second protrusions 105, alternatively, the first concave pieces 204 may be omitted, and only an upper edge of the second protrusion 105 and the lower edge of the mounting member 201 are snapped (the lower edge of the mounting member 201 is directly on the upper edge of the second protrusion 105), and in this way, since a part of the mounting member 201 is held between the extension portion 106 and the inner surface of the side plate 102, the lower edge of the mounting member 201 can also be immobilized.

It should be further noted that, although the above description is given by taking the case where the concave portions (e.g., the first grooves 104) are near the upper edge of the side plate 102, and the convex portions (e.g., the second protrusions 105) are near the lower edge of the side plate 102 as an example, but the present disclosure is not limited thereto. In practical applications, the positions of the concave portions may be exchanged with those of the convex portions, that is, the concave portions may be near the lower edge of the side plate 102, and the convex portion may be near the upper edge of the side plate 102. In this case, the positions of the first convex pieces 203 and the positions of the first concave pieces 204 on the mounting member 201 should be exchanged accordingly, so that the first convex pieces 203 and the first concave pieces 204 can be respectively snapped to the concave portions and the convex portions. Optionally, the concave portions and the convex portions may be respectively provided on two edges adjacent to each other, for example, the concave portions are provided on the left edge (or right edge) of the side plate 102, and the convex portions are provided on the upper edge (or lower edge) of the side plate 102. In this case, the positions of the first convex pieces 203 and first concave pieces 204 on the mounting member 201 should be adjusted correspondingly, so that the first convex pieces 203 and the first concave pieces 204 can be respectively snapped to the concave portions and the convex portions.

It should be further noted that, the present embodiment takes a case where the inner surface, at one side, of the side plate 102 serves as the mounting surface as an example, and in practical applications, the inner surface of the bottom plate 101 may serve as the mounting surface. In this case, the convex portions and/or the concave portions may be integrally formed with the bottom plate 101, for example, the convex portions and/or concave portions and the bottom plate 101 are formed simultaneously by stamping.

Figure 5:
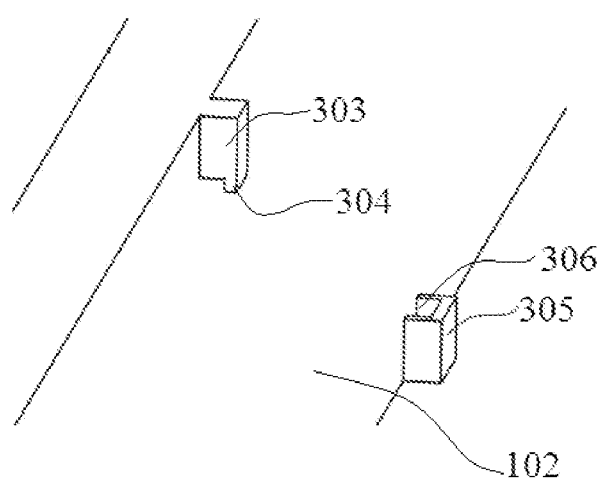
FIG. 5 is a structural diagram of a backplate used in another embodiment of the present disclosure.

FIG. 5 is a structural diagram of a backplate used in another embodiment of the present disclosure. Referring to FIG. 5, the backplate provided in this embodiment differs from the backplate shown in FIG. 2 mainly in that the concave portion provided on the side plate 102 has a different structure.

The case where the inner surface of the side plate 102 serves as the mounting surface and the inner surface of the side plate 102 is provided with a concave portion and a convex portion is described as an example. As shown in FIG. 5, the concave portion is a first groove 306 formed by a first protrusion 305 protruding in a direction perpendicular to the inner surface (mounting surface) of the side plate 102. The first protrusion 305 is a concave piece, which forms a first groove 306 together with the inner surface of the side plate 102 (an area enclosed by the concave piece and the inner surface of the side plate 102 is the first groove 306). The convex portion includes a second protrusion 303 protruding in the direction perpendicular to the inner surface of the side plate 102 and an extension portion 304 disposed on a side of the second protrusion 303, the extension portion 304 protrudes outwards (downwards) from the second protrusion 303 in a direction perpendicular to an upper edge of the side plate 102 and is parallel to the inner surface of the side plate 102, and a certain gap is formed between the extension portion 304 and the inner surface of the side plate 102. It could be understood that the gap between the extension portion 304 and the inner surface of the side plate 102 has a length equal to or slightly larger than the thickness of a light-emitting device, so that a part of the light-emitting device can be inserted into the gap between the inner surface of the side plate 102 and the extension portion 304.

Structure and function of the light-emitting device are the same as those of the light-emitting device described above, that is, a first convex piece 203 and a first concave piece 204 are respectively provided on upper and lower edges, as shown in FIG. 3, of the mounting member 201. The mounting member 201 is attached onto the inner surface of the side plate 102 such that the first convex piece 203 is inserted into the first groove 306, and the second protrusion 303 is inserted into the first concave piece 204, and thus the mounting member 201 and the side plate 102 are snap-connected. In addition, since a part of the mounting member 201 is inserted into the gap between the extension portion 304 and the inner surface of the side plate 102, the mounting member 201 can be held between the extension portion 304 and the inner surface of the side plate 102 to keep the mounting member 201 in place. In addition, since the first protrusion 305 is a concave piece, it can further immobilize the mounting member 201 by holding the first convex piece 203 in the first groove 306. In this case, both the upper and lower edges of the mounting member 201 are immobilized.

It should be noted that, although the case where the concave portions (e.g., the first grooves 306) are near the lower edge of the side plate 102, and the convex portions (e.g., the second protrusions 303) are near the upper edge of the side plate 102 is described herein as an example, but the present disclosure is not limited thereto. In practical applications, the positions of the concave portions may be exchanged with those of the convex portions, that is, the concave portions may be near the upper edge of the side plate 102, and the convex portion may be near the lower edge of the side plate 102. In this case, the positions of the first convex pieces 203 and the positions of the first concave pieces 204 on the mounting member 201 should be exchanged accordingly, so that the first convex pieces 203 and the first concave pieces 204 can be respectively snapped to the concave portions and the convex portions. Optionally, the concave portions and the convex portions may be respectively provided on two adjacent edges, for example, the concave portions may be provided on the left edge (or right edge) of the side plate 102, and the convex portions may be provided on the upper edge (or lower edge) of the side plate 102. In this case, the positions of the first convex pieces 203 and first concave pieces 204 on the mounting member 201 should be adjusted correspondingly, so that the first convex pieces 203 and the first concave pieces 204 can be respectively snapped to the concave portions and the convex portions.

Other components of the backlight module have structures and functions similar to those in the above embodiment, and are not repeatedly described because detailed descriptions thereof have been given in the above embodiment.

Needless to say, the inner surface of the side plate 102 may be provided with concave portions only, which include a first concave portion and a second concave portion respectively provided near two edges of the inner surface of the side plate 102, and the first concave portion and the second concave portion are respectively snapped to two edges of the mounting member 201. For example, on the inner surface of the side plate 102, a first concave piece and a second concave piece are respectively provided near the upper edge and lower edge of the side plate 102, and the first concave piece and the second concave piece have the same structure as the first protrusion 305 in FIG. 5. A first groove formed between the first concave piece and the inner surface of the side plate 102 serves as the first concave portion; a second groove formed between the second concave piece and the inner surface of the side plate 102 serves as the second concave portion. The first groove and the second groove have the same structure as the first groove 306 in FIG. 5.

Figure 6:
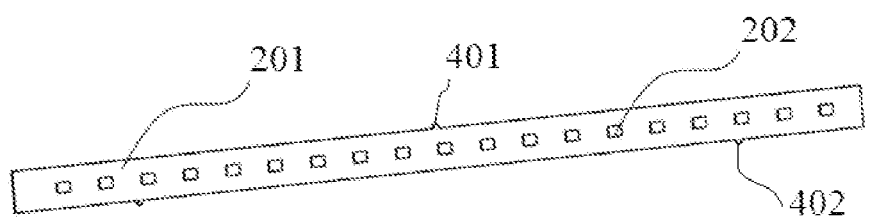
FIG. 6 is a structural diagram of a light-emitting device used in another embodiment of the present disclosure.

In this case, an adopted light-emitting device is shown in FIG. 6. Referring to FIG. 6, the light-emitting device includes a mounting member 201 and a plurality of light sources 202 disposed on the mounting member 201. A third protrusion 401 and a fourth protrusion 402 are provided on the upper and lower edges of the mounting member 201, respectively. The third protrusion 401 can be inserted into the first groove, and the fourth protrusion 402 can be inserted into the second groove, so that the mounting member 201 and the side plate 102 can be snap-connected.

Other components of the backlight module have structures and functions similar to those in the above embodiments, and are not repeatedly described because detailed descriptions thereof have been given in the above embodiments.

It should be noted that both the first concave portion and the second concave portion may have the same structure as the concave portion shown in FIG. 2 (i.e., the first groove 104 formed by the two parts of the first protrusion 103), instead of the first concave piece and the second concave piece described above. Specifically, the first concave portion may be a first groove formed by a first protrusion protruding in a direction perpendicular to the mounting surface, the first protrusion includes two parts spaced apart from each other and the space between the two parts forms the first groove. Similarly, the second concave portion may be a second groove formed by a second protrusion protruding in the direction perpendicular to the mounting surface, the second protrusion includes two parts spaced apart from each other and the space between the two parts forms the second groove. In this case, an adopted light-emitting device may have the same structure as the light-emitting device shown in FIG. 6.

Needless to say, the first concave portion and the second concave portion may be the concave portion shown in FIG. 2 (i.e., the first groove 104 formed by the two parts of the first protrusion 103) and the concave portion shown in FIG. 5 (i.e. the first groove 306 enclosed by the first protrusion 305 and the inner surface of the side plate 102), respectively. In this case, an adopted light-emitting device may have the same structure as the light-emitting device shown in FIG. 6.

Similar to the above embodiments, the number of the first concave portions and the number of the second concave portions are plural, in order to increase snap-on points. When the first concave portions and the second concave portions are arranged at two opposite edges of the side plate 102, respectively, the first concave portions and the second concave portions are staggered with respect to each other, so as to avoid a case where the mounting member 201 and the side plate 102 are partially separated. In addition, the number and positions of the third protrusions 401 of the mounting member 201 should be respectively in one-to-one correspondence with the number and positions of the first concave portions, and the number and positions of the fourth protrusions 402 of the mounting member 201 should be respectively in one-to-one correspondence with the number and positions of the second concave portions.

In some embodiments, the inner surface of the side plate 102 may be provided with a convex portion only, which includes a first convex portion and a second convex portion respectively provided near two edges (e.g., upper edge and lower edge) of the inner surface of the side plate 102, and the first convex portion and the second convex portion have the same structure as the second protrusion 105 shown in FIG. 2, so as to be snapped to the two opposite edges of the mounting member 201. In addition, at least one of the first convex portion and the second convex portion is provided with an extension portion, and the extension portion has the same structure as the extension portion 106 shown in FIG. 2 for holding the mounting member 201 between the extension portion and the inner surface of the side plate 102.

In this case, the mounting member 201 may be fitted into the first convex portion and/or the second convex portion by providing grooves. Alternatively, in a case where the extension portion protrudes upwards (or downwards) from the second protrusion 105 in a direction perpendicular to the lower edge (or upper edge) of the side plate 102, it is possible to provide no groove, and instead, the mounting member 201 can be immobilized only by respectively snapping edges of the first convex portion and the second convex portion to two edges of the mounting member 201.

Similar to the above embodiments, the number of the first convex portions and the number of the second convex portions are plural, in order to increase snap-on points. When the first convex portions and the second convex portions are arranged at two opposite edges of the side plate respectively, the first convex portions and the second convex portions are staggered with respect to each other, so as to avoid a case where the mounting member 201 and the side plate 102 are partially separated.

Other components of the backlight module have structures and functions similar to those in the above embodiments, and are not repeatedly described because detailed descriptions thereof have been given in the above embodiments.

By way of snapping using the concave portion and/or the convex portion, the backlight modules provided by embodiments of the present disclosure can fix the mounting member of the light-emitting device onto the mounting surface of the backplate, the assembly and fixing of the light-emitting device can be realized without an additional fixing piece, so that steps of assembling or disassembling the light-emitting device can be simplified, which, in turn, can improve production efficiency and be conducive to high integration manufacturing of backlight modules.

In another aspect, the present disclosure provides a display apparatus, which includes any one of the backlight modules provided as above. By adopting the backlight module provided by the present disclosure, steps of assembling or disassembling the light-emitting device can be simplified, and thus production efficiency can be improved, which facilitates high integration manufacturing of backlight modules.

It could be understood that, the above implementations are merely exemplary implementations for explaining the principle of the present disclose, and the present invention is not limited thereto. For those of ordinary skill in the art, various variations and improvements can be made without departing from the spirit and essence of the present invention, and these variations and improvements are also considered as falling into the protection scope of the present disclosure.

The invention claimed is:

1. A backlight module comprising a backplate and a light-emitting device, the backplate having a mounting surface, the light-emitting device comprising a mounting member and a light source disposed on the mounting member, wherein the backplate comprises a concave portion and a convex portion, and the concave portion and the convex portion are able to fix the mounting member onto the mounting surface, wherein
    the concave portion is a first groove formed by a first protrusion protruding in a direction perpendicular to the mounting surface; and
    the convex portion comprises a second protrusion protruding in the direction perpendicular to the mounting surface and at least one extension portion provided at a side of the second protrusion, the extension portion is parallel to the mounting surface, and a certain gap is formed between the extension portion and the mounting surface such that a part of the mounting member is held between the extension portion and the mounting surface.

2. The backlight module according to claim 1, wherein the concave portion is snapped to one edge of the mounting member, and the convex portion is snapped to another edge of the mounting member; the first protrusion comprises two parts spaced apart from each other, and a space between the two parts forms the first groove.

3. The backlight module according to claim 1, wherein the concave portion is snapped to one edge of the mounting member, and the convex portion is snapped to another edge of the mounting member; and the first protrusion is a concave piece, and a space between the concave piece and the mounting surface forms the first groove.

4. The backlight module according to claim 1, wherein one edge of the mounting member is provided with a first convex piece, the first convex piece and the concave portion are snapped with each other, and another edge of the mounting member and the second protrusion are snapped with each other.

5. The backlight module according to claim 1, wherein the concave portion and the convex portion are snapped to two opposite edges of the mounting member, respectively, the backplate comprises a plurality of the concave portions and a plurality of the convex portions, and the concave portions and the convex portions are staggered with respect to each other.

6. The backlight module according to claim 1, wherein the extension portion protrudes outwards from the second protrusion in a direction parallel to an edge of the mounting member.

7. The backlight module according to claim 1, wherein the extension portion protrudes outwards from the second protrusion in a direction perpendicular to an edge of the mounting member.

8. The backlight module according to claim 1, wherein the backplate comprises a bottom plate and a side plate surrounding the bottom plate, and an inner surface of the side plate serves as the mounting surface.

9. The backlight module according to claim 1, wherein the backplate comprises a bottom plate and a side plate surrounding the bottom plate, and an inner surface of the bottom plate serves as the mounting surface.

10. A display apparatus, comprising the backlight module according to claim 1.

11. The backlight module according to claim 4, wherein said another edge of the mounting member is provided with a first concave piece, and the first concave piece and the second protrusion are snapped with each other.

12. The backlight module according to claim 8, wherein the light-emitting device further comprises a connector, an opening is provided on the side plate, and the connector is provided in the opening to electrically connect the light source to an external power supply.

13. A backlight module, comprising a backplate and a light-emitting device, the backplate having a mounting surface, the light-emitting device comprising a mounting member and a light source disposed on the mounting member, wherein the backplate comprises concave portions, and the concave portions are able to fix the mounting member onto the mounting surface, wherein the concave portions comprise a first concave portion and a second concave portion, the first concave portion and the second concave portion are snapped to two edges of the mounting member, respectively, wherein the first concave portion is a first groove formed by a first protrusion protruding in a direction perpendicular to the mounting surface, the first protrusion comprises two parts spaced apart from each other and a space between the two parts forms the first groove; and the second concave portion is a second groove formed by a second protrusion protruding in the direction perpendicular to the mounting surface, the second protrusion comprises two parts spaced apart from each other and a space between the two parts forms the second groove.

14. A backlight module, comprising a backplate and a light-emitting device, the backplate having a mounting surface, the light-emitting device comprising a mounting member and a light source disposed on the mounting member, wherein the backplate comprises concave portions, and the concave portions are able to fix the mounting member onto the mounting surface, wherein the concave portions comprise a first concave portion and a second concave portion, the first concave portion and the second concave portion are snapped to two edges of the mounting member, respectively, wherein the first concave portion is a first groove formed between a concave piece provided on the mounting surface and the mounting surface; and the second concave portion is a second groove formed by a second protrusion protruding in the direction perpendicular to the mounting surface, the second protrusion comprises two parts spaced apart from each other and a space between the two parts forms the second groove.

\* \* \* \* \*